United States Patent
Zhao et al.

(10) Patent No.: US 12,374,755 B2
(45) Date of Patent: Jul. 29, 2025

(54) NON-WOVEN FABRIC SEPARATION MEMBRANE AND PREPARATION METHOD AND USE THEREOF

(71) Applicant: Zhuhai CosMX Battery Co., Ltd., Zhuhai (CN)

(72) Inventors: Wei Zhao, Zhuhai (CN); Suli Li, Zhuhai (CN); Weichao Tang, Zhuhai (CN); Hao Yuan, Zhuhai (CN); Junyi Li, Zhuhai (CN); Yanming Xu, Zhuhai (CN)

(73) Assignee: ZHUHAI COSMX BATTERY CO., LTD., Zhuhai (CN)

( * ) Notice: Subject to any disclaimer, the term of this patent is extended or adjusted under 35 U.S.C. 154(b) by 831 days.

(21) Appl. No.: 17/590,340

(22) Filed: Feb. 1, 2022

(65) Prior Publication Data

US 2022/0158300 A1 May 19, 2022

Related U.S. Application Data

(63) Continuation of application No. PCT/CN2020/107895, filed on Aug. 7, 2020.

(30) Foreign Application Priority Data

Aug. 7, 2019 (CN) .......................... 201910726972.1

(51) Int. Cl.
*H01M 50/44* (2021.01)
*H01M 50/403* (2021.01)
(Continued)

(52) U.S. Cl.
CPC .......... *H01M 50/44* (2021.01); *H01M 50/403* (2021.01); *H01M 50/42* (2021.01); *H01M 50/446* (2021.01)

(58) Field of Classification Search
CPC .......... H01M 10/0525; H01M 10/054; H01M 50/44; H01M 50/403; H01M 50/42;
(Continued)

(56) References Cited

FOREIGN PATENT DOCUMENTS

| CN | 1190979 A | 8/1998 |
| CN | 1679185 A | 10/2005 |

(Continued)

OTHER PUBLICATIONS

First Office Action in CN Patent Application No. 201910726972.1., dated Aug. 12, 2021.
(Continued)

*Primary Examiner* — Matthew W Van Oudenaren
(74) *Attorney, Agent, or Firm* — Dilworth IP, LLC (57) ABSTRACT

The present application provides a non-woven fabric separation membrane and a preparation method and a use thereof. The non-woven fabric separation membrane of the present application includes a plurality of fibers, and the fibers are closely connected to each other through a modifier, which significantly improves the tensile strength and the puncture strength of the separation membrane. Meanwhile, molecules of the modifier are grafted on surfaces of the fibers, which improves wettability for an electrolyte solution to the separation membrane, thereby improving the ionic conductivity of the separation membrane and the rate performance of a battery. Ti metal or Zr metal in the modifier molecule can effectively attract an electrolyte anion in the electrolyte solution to improve the ion migration number of the electrolyte solution, reduce battery polarization, and improve the rate performance of the battery.

8 Claims, 2 Drawing Sheets

(51) Int. Cl.
*H01M 50/42* (2021.01)
*H01M 50/446* (2021.01)

(58) Field of Classification Search
CPC ............ H01M 50/446; H01M 50/414; H01M 50/437; H01M 50/449; H01M 50/409
See application file for complete search history.

(56) References Cited

FOREIGN PATENT DOCUMENTS

| | | | |
|---|---|---|---|
| CN | 103296240 | * | 9/2013 |
| CN | 103296240 A | | 9/2013 |
| CN | 103649187 A | | 3/2014 |
| CN | 103928649 A | | 7/2014 |
| CN | 104088155 A | | 10/2014 |
| CN | 106784546 A | | 5/2017 |
| CN | 108649170 A | | 10/2018 |
| CN | 110024202 A | | 7/2019 |
| JP | H0214258 A | | 1/1990 |
| JP | 2019116705 A | | 7/2019 |
| WO | 2019143483 A1 | | 7/2019 |

OTHER PUBLICATIONS

International Search Report in International Patent Application No. PCT/CN2020/107895 dated Oct. 28, 2020.
Second Office Action in CN Patent Application No. 201910726972.1 dated Dec. 22, 2021.

* cited by examiner

NON-WOVEN FABRIC SEPARATION MEMBRANE AND PREPARATION METHOD AND USE THEREOF

CROSS-REFERENCE TO RELATED APPLICATIONS

This application is a continuation of International Application No. PCT/CN2020/107895, filed on Aug. 7, 2020, which claims priority to Chinese Patent Application No. 201910726972.1, filed with the China National Intellectual Property Administration on Aug. 7, 2019, entitled "NON-WOVEN FABRIC SEPARATION MEMBRANE AND PREPARATION METHOD AND USE THEREOF", which are incorporated by reference in their entireties.

TECHNICAL FIELD

The present application relates to the battery technical field and, in particular, to a non-woven fabric separation membrane and a preparation method and a use thereof.

BACKGROUND

Non-woven fabric separation membrane is a new type of separation membrane for a battery, and can be prepared by using a high temperature resistant polymer as a raw material. It usually has the advantages of high temperature resistance, high porosity, and low cost. However, the common non-woven fabric separation membrane has low mechanical strength and low anti-puncture strength, which is easy to lead to the phenomena of micro short circuit and high self-discharge of the battery, and has low tensile strength, which is not conducive to its production on an automatic production equipment where it needs to bear a certain tension. These defects seriously limit its popularization and application.

Coating a ceramic layer or polymer layer on a surface of the non-woven fabric separation membrane, or directly mixing ceramic powder in the preparation stage of the non-woven fabric separation membrane to form a composite membrane can improve its anti-puncture strength to a certain extent and alleviate the micro short circuit of the battery. However, these measures cannot improve its tensile strength. In addition, hole plugging caused by ceramic or polymer will also affect the rate performance of the battery.

Therefore, it is of great significance to develop a non-woven fabric separation membrane with higher strength and higher ionic conductivity.

SUMMARY

In order to improve the shortcomings of the prior art, a purpose of the present application is to provide a non-woven fabric separation membrane, and a preparation method and a use thereof. The preparation method can improve the mechanical strength of the non-woven fabric separation membrane, wettability of an electrolyte solution, and ion conductivity, improve the rate performance of a battery and reduce self-discharge caused by the micro short circuit of the battery.

In order to achieve the above purpose, the present application adopts the following technical solution:
a non-woven fabric separation membrane, where the non-woven fabric separation membrane includes a plurality of polymer fibers and/or glass fibers, the non-woven fabric separation membrane is modified by a modifier, the modifier is bonded with the fibers by a chemical bond, and molecules of the modifier are connected to each other by cross-linking;
where the modifier is selected from one or more compounds with a structure shown in the following formula (1):

formula (1)

$M = Zr$ or $Ti$, $n$ is an integer between 0 and 10000;

$R_1$, $R_2$ and $R_3$ are the same or different, and are independently selected from $-NH_2$, $-COCR_0=CH_2$, $-(CH_2CH_2O)_{n1}COCR_0=CH_2$ ($n1$ is an integer greater than or equal to 0), $-(CH_2CH_2O)_{n2}R_0$ ($n2$ is an integer greater than or equal to 1), ($n3$ is an integer greater than or equal to 0), and the following groups that are unsubstituted or optionally substituted by one, two or more $R_a$: $C_{1-12}$ alkyl, $C_{2-12}$ alkenyl, $-C_{1-12}$ alkylene-O-$C_{1-12}$ alkyl, $-COOC_{1-12}$ alkyl, and $C_{6-20}$ aryl;

each $R_a$ is the same or different, and is independently selected from halogen (F, Cl, Br, I), $-NH_2$, $-OH$, $C_{1-12}$ alkyl, $C_{6-20}$ aryl;

$R_0$ is selected from H, and the following groups that are unsubstituted or optionally substituted by one, two or more $R_b$: $C_{1-12}$ alkyl, $C_{6-20}$ aryl;

each $R_b$ is the same or different, and is independently selected from $C_{1-12}$ alkyl and $C_{6-20}$ aryl;

where $n$, $n1$, $n2$ and $n3$ respectively represent an average degree of polymerization of corresponding repeating units.

According to the present application, $R_1$, $R_2$ and $R_3$ are the same or different, and are independently selected from $-COCR_0=CH_2$, $(CH_2CH_2O)_{n1}COCR_0=CH_2$ ($n1$ is an integer greater than or equal to 0), $-(CH_2CH_2O)_{n2}R_0$ ($n2$ is an integer greater than or equal to 1), ($n3$ is an integer greater than or equal to 0), $C_{1-6}$ alkyl, $C_{2-6}$ alkenyl, $-C_{1-6}$ alkylene-OH, $-C_{1-6}$ alkylene-NH$_2$, $-C_{1-6}$ alkylene-O-$C_{1-6}$ alkyl, $-COOC_{1-6}$ alkyl, $-C_6H_5$, $-(CH_2)_{n4}C_6H_5$ ($n4$ is an integer greater than or equal to 1), $-C_6H_4C_{n'}H_{2n'+1}$ ($n'$ is an integer greater than or equal to 1), and $-C_6H_{5-m}F_m$ ($m$ is an integer between 1 and 5), the definition of $R_0$ is the same as above.

According to the present application, $R_0$ is selected from H, $C_{1-6}$ alkyl, $-C_6H_5$, $-(CH_2)_{n5}C_6H_5$ ($n5$ is an integer between 1 and 6), and $-C_6H_4C_{n''}H_{2n''+1}$ ($n''$ is an integer between 1 and 6).

According to the present application, $R_1$, $R_2$ and $R_3$ are the same or different, and are independently selected from $-CH_3$, $-C_2H_5$, n-propyl, isopropyl, $-C_{12}H_{25}$, —$CH=CH_2$, —$C_2H_4OH$, —$C_6H_5$, —$CH_2OCH_3$, —COO—$CH_3$, —$CH_2NH_2$, —$C_6F_5$, —$COCR_0=CH_2$, —$(CH_2CH_2O)_{n1}COCR_0=CH_2$ (n1 is an integer greater than or equal to 0), —$C_6H_4F$, —$C_{12}H_{24}OH$, (n3 is an integer greater than or equal to 0), and —$(CH_2CH_2O)_{n2}R_0$ (n2 is an integer greater than or equal to 1), where $R_0$ is selected from H, $C_{1-6}$ alkyl, —$C_6H_5$, —$(CH_2)_{n5}C_6H_5$ (n5 is an integer between 1 and 6), and —$C_6H_4C_{n''}H_{2n''+1}$ (n'' is an integer between 1 and 6).

According to the present application, the non-woven fabric separation membrane has a tensile strength of 20-200 MPa, and a puncture strength of 20-200 Gf.

According to the present application, the non-woven fabric separation membrane, after being wetted by an electrolyte solution, has an ionic conductivity of 1-20 ms/cm, and an ion migration number of 0.3-0.9.

According to the present application, the non-woven fabric separation membrane has a porosity of 10-90%, and a pore diameter of 0.1-3 μm.

According to the present application, a mass of the modifier in the non-woven fabric separation membrane accounts for 0.01-9 wt %, for example, 0.01 wt %, 0.02 wt %, 0.05 wt %, 0.08 wt %, 0.1 wt %, 0.2 wt %, 0.5 wt %, 0.8 wt %, 1 wt %, 2 wt %, 3 wt %, 4 wt %, 5 wt %, 6 wt %, 7 wt %, 8 wt %, and 9 wt % based on a total mass of the non-woven fabric separation membrane.

According to the present application, the fiber (polymer fiber and/or glass fiber) has a diameter of 0.01-10 μm, for example, 0.01 μm, 0.02 μm, 0.05 μm, 0.08 μm, 0.1 μm, 0.2 μm, 0.5 μm, 0.8 μm, 1.0 μm, 1.2 μm, 1.5 μm, 1.8 μm, 2 μm, 3 μm, 4 μm, 5 μm, 6 μm, 7 μm, 8 μm, 9 μm, and 10 μm.

According to the present application, the fiber (polymer fiber and/or glass fiber) has a length of greater than or equal to 0.1 μm, for example, greater than or equal to 1 μm.

The present application also provides a preparation method of a non-woven fabric separation membrane, the preparation method includes the following steps:

1) dissolving a modifier in an organic solvent and water to obtain a mixed solution;
2) wetting the non-woven fabric with the mixed solution obtained, taking out, then washing, drying, and ultraviolet lighting to prepare the non-woven fabric separation membrane;

where the modifier is selected from one or more compounds with a structure shown in the following formula (1):

the definitions of M, n, $R_1$, $R_2$, $R_3$ and $R_0$ are the same as above.

Further, in step 1), in the mixed solution, a mass fraction of water in the mixed solution is 0.1-99.8 wt %, for example, 0.1 wt %, 0.2 wt %, 0.5 wt %, 1 wt %, 2 wt %, 5 wt %, 10 wt %, 15 wt %, 20 wt %, 30 wt %, 40 wt %, 50 wt %, 60 wt %, 70 wt %, 80 wt %, 90 wt %, 95 wt %, 99 wt %, and 99.8 wt %;

a mass fraction of the modifier in the mixed solution is 0.1-99.8 wt %, for example, 0.1 wt %, 0.2 wt %, 0.5 wt %, 1 wt %, 2 wt %, 5 wt %, 10 wt %, 15 wt %, 20 wt %, 30 wt %, 40 wt %, 50 wt %, 60 wt %, 70 wt %, 80 wt %, 90 wt %, 95 wt %, 99 wt %, and 99.8 wt %;

a mass fraction of the organic solvent in the mixed solution is 0.1-99.8 wt %, for example, 0.1 wt %, 0.2 wt %, 0.5 wt %, 1 wt %, 2 wt %, 5 wt %, 10 wt %, 15 wt %, 20 wt %, 30 wt %, 40 wt %, 50 wt %, 60 wt %, 70 wt %, 80 wt %, 90 wt %, 95 wt %, 99 wt %, and 99.8 wt %.

Further, in step 1), the organic solvent is selected from at least one of ethanol, acetone, toluene, and xylene.

Further, in step 2), the non-woven fabric can be an non-woven fabric prepared by at least one fiber of polyethylene (PE) fiber, polypropylene (PP) fiber, polyvinyl chloride (PVC) fiber, polyethylene terephthalate (PET) fiber, cellulose fiber, poly-p-phthaloyl-p-phenylenediamine (aramid) fiber, polyurethane (spandex) fiber, polyimide (PI) fiber, polyvinyl alcohol (PVA) fiber, polyhexamethylene adipamide fiber, polyvinyl formal fiber, polyvinyl butyral (PVB) fiber, polyacrylonitrile (PAN) fiber, polyvinyl acetate (PVAc) fiber, and glass fiber.

Further, the fiber has a diameter of 0.01-10 μm, for example, 0.01 μm, 0.02 μm, 0.05 μm, 0.08 μm, 0.1 μm, 0.2 μm, 0.5 μm, 0.8 μm, 1.0 μm, 1.2 μm, 1.5 μm, 1.8 μm, 2 μm, 3 μm, 4 μm, 5 μm, 6 μm, 7 μm, 8 μm, 9 μm, and 10 μm.

Further, the fiber has a length of greater than or equal to 0.1 μm, for example, greater than or equal to 1 μm.

Further, in step 2), the non-woven fabric has a thickness of 1-200 μm.

Further, in step 2), a wetting temperature is 20-90° C., and a wetting time is 0.1-12 h. The preparation of the non-woven fabric separation membrane modified by the modifier having different masses can be realized by adjusting the wetting temperature, wetting time, and an amount of the modifier in the mixed solution of step 1).

Further, in step 2), a drying temperature is 30-200° C., and a drying time is not particularly limited as long as moisture can be dried, or the drying time can be adjusted according to the drying temperature, for example, 0.5-24 h.

Further, in step 2), an ultraviolet lighting time is 1-60 min, an ultraviolet wavelength range is 100-400 nm, for example, 365 nm, and an ultraviolet power is 10 μW/cm² –10 W/cm².

According to the present application, the method specifically includes the following steps:

S1: mixing a certain amount of the organic solvent and water evenly to obtain a mixed solvent, and then adding the modifier into the mixed solvent, stirring and dissolving to obtain the mixed solution;

S2: wetting the non-woven fabric with the mixed solution obtained for 0.1-12 h at 20-90° C., taking out, then washing with the organic solvent or water, drying at 30-200° C., and ultraviolet lighting for 1-60 min to obtain the required non-woven fabric separation membrane.

The present application also provides a non-woven fabric separation membrane, the non-woven fabric separation membrane is obtained by the above-mentioned preparation method of the non-woven fabric separation membrane.

The present application also provides a use of a non-woven fabric separation membrane in a lithium-ion battery, a sodium-ion battery, a potassium-ion battery, a lithium sulfur battery, and a lithium metal battery.

The term "$C_{1-12}$ alkyl" should be understood to preferably represent a linear or branched saturated monovalent hydrocarbon group having 1 to 12 carbon atoms, preferably $C_{1-10}$ alkyl. "$C_{1-10}$ alkyl" should be understood to preferably represent a linear or branched saturated monovalent hydrocarbon group having 1, 2, 3, 4, 5, 6, 7, 8, 9 or 10 carbon atoms. The alkyl group is, for example, methyl, ethyl, propyl, butyl, pentyl, hexyl, isopropyl, isobutyl, sec-butyl, tert-butyl, isopentyl, 2-methylbutyl, 1-methylbutyl, 1-ethylpropyl, 1,2-dimethylpropyl, neopentyl, 1,1-dimethylpropyl, 4-methylpentyl, 3-methylpentyl, 2-methylamyl, 1-methylamyl, 2-ethylbutyl, 1-ethylbutyl, 3,3-dimethylbutyl, 2,2-dimethylbutyl, 1,1-dimethylbutyl, 2,3-dimethylbutyl, 1,3-dimethylbutyl or 1,2-dimethylbutyl or their isomers. In particular, the group has 1, 2, 3, 4, 5, 6 carbon atoms ("$C_{1-6}$ alkyl"), for example, methyl, ethyl, propyl, butyl, isopropyl, isobutyl, sec-butyl, tert-butyl, and more particularly, the group has 1, 2 or 3 carbon atoms ("$C_{1-3}$ alkyl"), for example, methyl, ethyl, n-propyl, or isopropyl.

The term "$C_{1-12}$ alkylene" should be understood that it is obtained from the above "$C_{1-12}$ alkyl" without one end group H.

The term "$C_{2-12}$ alkenyl" should be understood to preferably represent a linear or branched chain monovalent hydrocarbon group containing one or more double bonds and having 2-12 carbon atoms, preferably "$C_{2-10}$ alkenyl". "$C_{2-10}$ alkenyl" should be understood to preferably represent a linear or branched chain monovalent hydrocarbon group containing one or more double bonds and having 2, 3, 4, 5, 6, 7, 8, 9 or 10 carbon atoms, preferably 2 or 3 carbon atoms ("$C_{2-3}$ alkenyl"). It should be understood that when the alkenyl contains more than one double bond, the double bonds can be separated or conjugated to each other. The alkenyl is, for example, vinyl, allyl, (E)-2-methylvinyl, (Z)-2-methylvinyl, (E)-but-2-enyl, (Z)-but-2-enyl, (E)-but-1-enyl, (Z)-but-1-enyl, pent-4-enyl, (E)-pent-3-enyl, (Z)-pent-3-enyl, (E)-pent-2-enyl, (Z)-pent-2-enyl, (E)-pent-1-enyl, (Z)-pent-1-enyl, hex-5-enyl, (E)-hex-4-enyl, (Z)-hex-4-enyl, (E)-hex-3-enyl, (Z)-hex-3-enyl, (E)-hex-2-enyl, (Z)-hex-2-enyl, (E)-hex-1-enyl, (Z)-hex-1-enyl, isopropenyl, 2-methylpropanyl-2-enyl, 1-methylprop-2-enyl, 2-methylprop-1-enyl, (E)-1-methylprop-1-enyl, (Z)-1-methyl prop-1-enyl, 3-methylbut-3-enyl, 2-methylbut-3-enyl, 1-methylbut-3-enyl, 3-methylbut-2-enyl, (E)-2-methylbut-2-enyl, (Z)-2-methylbut-2-enyl, (E)-1-methylbut-2-enyl, (Z)-1-methylbut-2-enyl, (E)-3-methylbut-1-enyl, (Z)-3-methylbut-1-enyl, (E)-2-methylbut-1-enyl, (Z)-2-methylbut-1-enyl, (E)-1-methylbut-1-enyl, (Z)-1-methylbut-1-enyl, 1,1-dimethylprop-2-enyl, 1-ethylprop-1-enyl, 1-propylvinyl, and 1-isopropylvinyl.

The term "$C_{6-20}$ aryl" should be understood to preferably represent a monovalent aromatic or partial aromatic monocyclic, bicyclic or tricyclic hydrocarbon ring having 6-20 carbon atoms, preferably "$C_{6-14}$ aryl". The term "$C_{6-14}$ aryl" should be understood to preferably represent a monovalent aromatic or partial aromatic monocyclic, bicyclic or tricyclic hydrocarbon ring having 6, 7, 8, 9, 10, 11, 12, 13 or 14 carbon atoms ("$C_{6-14}$ aryl"), preferably a ring having 6 carbon atoms ("$C_6$ aryl"), for example, phenyl, or biphenyl, or a ring having 9 carbon atoms ("$C_9$ aryl"), for example, indanyl or indenyl, or a ring having 10 carbon atoms ("$C_{10}$ aryl"), for example, tetrahydronaphthyl, dihydronaphthyl or naphthyl, or a ring having 13 carbon atoms ("$C_{13}$ aryl"), for example, fluorenyl, or a ring having 14 carbon atoms ("$C_{14}$ aryl"), for example, anthracyl.

Beneficial effects of the present application:
the present application provides a non-woven fabric separation membrane and a preparation method and a use thereof. The non-woven fabric separation membrane of the present application includes a plurality of fibers, and the fibers are closely connected through a modifier, which significantly improves the tensile strength and puncture strength of the separation membrane. Meanwhile, molecules of the modifier are grafted on surfaces of the fibers, which improves wettability for an electrolyte solution to the separation membrane, thereby improving the ionic conductivity of the separation membrane and the rate performance of a battery. Ti metal or Zr metal in the modifier molecule can effectively attract an electrolyte anion in the electrolyte solution to improve the ion migration number of the electrolyte solution, reduce battery polarization, and improve the rate performance of the battery.

DESCRIPTION OF EMBODIMENTS

The preparation method of the present application will be further described in detail below in combination with specific embodiments. It should be understood that the following embodiments are only illustrative and explanatory of the present application and should not be interpreted as limiting the protection scope of the present application. All technologies realized based on the above contents of the present application are covered within the protection scope of the present application.

Unless otherwise specified, the experimental methods used in the following examples are conventional methods, the reagents and materials used in the following examples can be obtained from commercial sources unless otherwise specified.

The method for testing a tensile strength of a separation membrane used in the following examples refers to GB/T 1040.3-2006 test standard. The method for testing a puncture strength of the separation membrane refers to GB/T 10004-2008 standard.

The method used in the following examples for testing an ionic conductivity of the separation membrane after being wetted in an electrolyte solution refers to an AC impedance method in the reference document (Xu Jieru, Ling Shigang, Wang Shaofei, Pan Du, Nie Kaihui, Zhang Hua, Qiu Jiliang, Lu Jiaze, and Li Hong. *Conductivity test and analysis method for research of lithium batteries* [*J*] Energy Storage Science and Technology, 2018, 7(5): 926-957).

The method used in the following examples for testing an ion migration number of the separation membrane after being wetted in the electrolyte solution refers to a test method of the combination of a constant potential DC polarization method and an AC impedance method in the reference document (Xu Jieru, Ling Shigang, Wang Shaofei, Pan Du, Nie Kaihui, Zhang Hua, Qiu Jiliang, Lu Jiaze, and Li Hong. *Conductivity test and analysis method for research* of lithium batteries [J] Energy Storage Science and Technology, 2018, 7(5): 926-957).

A total mass of a mixed solution used in the following examples is 100 g. Exemplarily, 50 parts of water is 50 g of water, 49 parts of ethanol is 49 g of ethanol, and 1 part of modifier is 1 g of modifier.

PET non-woven fabric, cellulose non-woven fabric, glass fiber non-woven fabric, and a mixed non-woven fabric of glass fiber and PE fiber used in the following examples have the same dimension (length and width).

The molecular structures of modifiers G1-G8 used in the following examples are shown in Table 1.

TABLE 1

Structure of modifier G1-G8

| Modifier | M | n | $R_1$ | $R_2$ | $R_3$ | $R_0$ |
|---|---|---|---|---|---|---|
| G1 | Zr | 4 | —$CH_3$ | —$CH_3$ | —$CH_3$ | —H |
| G2 | Zr | 8 | —$C_2H_5$ | —$CH_3$ | —$C_{12}H_{25}$ (n-dodecyl) | —$CH_3$ |
| G3 | Ti | 12 | —$C_2H_3$ (vinyl) | —$C_3H_7$ (isopropyl) | —$C_2H_4OH$ | —$CH_2C_6H_5$ |
| G4 | Ti | 20 | —$C_6H_5$ | —$CH_2OCH_3$ | —$COOCH_3$ | —$C_6H_5$ |
| G5 | Zr | 100 | —$CH_2NH_2$ | —$C_6F_5$ | —$COCH=CH_2$ | —$C_6H_4C_2H_5$ |
| G6 | Zr | 150 | —$(CH_2CH_2O)_9COC(CH_3)=CH_2$ | —$C_6H_4F$ | —$C_{12}H_{24}OH$ | —H |
| G7 | Ti | 1,000 | —$(CH_2CH_2O)_{10}$—(epoxide) | —$CH_3$ | —$C_2H_5$ | —$C_2H_5$ |
| G8 | Ti | 10,000 | —$(CH_2CH_2O)_8C_2H_5$ | —$CH_3$ | —$C_3H_7$ (isopropyl) | —$C_3H_7$ (n-propyl) |

Examples 1-4

According to the mass calculation, 50 parts of water and 49 parts of ethanol were mixed evenly, and then 1 part of a modifier (the selection of the modifier is shown in Table 2) was added into a mixed solvent, stirred and dissolved to obtain a mixed solution. The mass fraction of water in the mixed solution is 50%, and the mass fraction of the modifier in the mixed solution is 1%. A PET non-woven fabric with a thickness of 20 μm was wetted with the resulting mixed solution at 20° C. for 12 h, the separation membrane was took out, washed with ethanol, dried at 30° C. and irradiated with ultraviolet light for 1 min to obtain a required non-woven fabric separation membrane. The tensile strength and puncture strength of the separation membrane, ionic conductivity and ion migration number of the separation membrane after being wetted in an electrolyte solution were tested.

The obtained non-woven separation membrane, a lithium cobalt oxide positive electrode, a graphite negative electrode, and a conventional commercial lithium ion battery electrolyte solution were assembled into a lithium-ion battery, and the rate performance of the lithium-ion battery (test method: testing a discharge capacity retention rate at 5C rate) and the self-discharge rate of the lithium-ion battery (test method: capacity loss of the battery for 7 days) were tested.

Examples 1~4 were obtained by using the experimental schemes of different modifiers G1-G4 respectively, the performance test results are shown in Table 2.

Example 1a

According to the mass calculation, 50 parts of water and 49.9 parts of ethanol were mixed evenly, and then 0.1 part of a modifier G1 was added into a mixed solvent, stirred and dissolved to obtain a mixed solution. The mass fraction of water in the mixed solution is 50%, and the mass fraction of the modifier in the mixed solution is 0.1%. A PET non-woven fabric with a thickness of 20 μm was wetted with the resulting mixed solution at 20° C. for 12 h, the separation membrane was took out, washed with ethanol, dried at 30° C. and irradiated with ultraviolet light for 1 min to obtain a required non-woven fabric separation membrane. The tensile strength and puncture strength of the separation membrane, ionic conductivity and ion migration number of the separation membrane after being wetted in an electrolyte solution were tested.

The obtained non-woven separation membrane, a lithium cobalt oxide positive electrode, a graphite negative electrode, and a conventional commercial lithium ion battery electrolyte solution were assembled into a lithium-ion battery, and the rate performance of the lithium-ion battery (test method: testing a discharge capacity retention rate at 5C rate) and the self-discharge rate of the lithium-ion battery (test method: capacity loss of the battery for 7 days) were tested.

Example 1a was obtained from the experimental scheme and the performance test results are shown in Table 2.

Example 1b

According to the mass calculation, 50 parts of water and 48 parts of ethanol were mixed evenly, and then 2 parts of a modifier G1 was added into a mixed solvent, stirred and dissolved to obtain a mixed solution. The mass fraction of water in the mixed solution is 50%, and the mass fraction of the modifier in the mixed solution is 2%. A PET non-woven fabric with a thickness of 20 μm was wetted with the resulting mixed solution at 20° C. for 12 h, the separation membrane was took out, washed with ethanol, dried at 30° C. and irradiated with ultraviolet light for 1 min to obtain a required non-woven fabric separation membrane. The tensile strength and puncture strength of the separation membrane, ionic conductivity and ion migration number of the separation membrane after being wetted in an electrolyte solution were tested.

The obtained non-woven separation membrane, a lithium cobalt oxide positive electrode, a graphite negative electrode, and a conventional commercial lithium-ion battery electrolyte solution were assembled into a lithium-ion battery, and the rate performance of the lithium-ion battery (test method: testing a discharge capacity retention rate at 5C rate) and the self-discharge rate of the lithium-ion battery (test method: capacity loss of the battery for 7 days) were tested.

Example 1b was obtained from the experimental scheme and the performance test results are shown in Table 2.

Example 1c

According to the mass calculation, 50 parts of water and 40 parts of ethanol were mixed evenly, and then 10 parts of a modifier G1 was added into a mixed solvent, stirred and dissolved to obtain a mixed solution. The mass fraction of water in the mixed solution is 50%, and the mass fraction of the modifier in the mixed solution is 10%. A PET non-woven fabric with a thickness of 20 μm was wetted with the resulting mixed solution at 20° C. for 12 h, the separation membrane was took out, washed with ethanol, dried at 30° C. and irradiated with ultraviolet light for 1 min to obtain a required non-woven fabric separation membrane. The tensile strength and puncture strength of the separation membrane, ionic conductivity and ion migration number of the separation membrane after being wetted in an electrolyte solution were tested.

The obtained non-woven separation membrane, a lithium cobalt oxide positive electrode, a graphite negative electrode, and a conventional commercial lithium-ion battery electrolyte solution were assembled into a lithium-ion battery, and the rate performance of the lithium-ion battery (test method: testing a discharge capacity retention rate at 5C rate) and the self-discharge rate of the lithium-ion battery (test method: capacity loss of the battery for 7 days) were tested.

Example 1c was obtained from the experimental scheme and the performance test results are shown in Table 2.

Comparative Example 1

The tensile strength and puncture strength of a PET non-woven fabric with a thickness of 20 μm without modifier treatment, ionic conductivity and ionic migration number of the PET non-woven fabric after being wetted in an electrolyte solution were tested. And the PET non-woven fabric with a thickness of 20 μm without modifier treatment, a lithium cobalt oxide positive electrode, a graphite negative electrode, and a conventional commercial lithium ion battery electrolyte solution were assembled into a lithium-ion battery, and the rate performance of the lithium-ion battery (test method: testing a discharge capacity retention rate at 5C rate) and the self-discharge rate of the lithium-ion battery (test method: capacity loss of the battery for 7 days) were tested. The performance test results of the comparative example 1 are shown in Table 2.

TABLE 2

| | | performance test results | | | | | |
|---|---|---|---|---|---|---|---|
| | Modifier | Tensile strength of separation membrane (MPa) | Puncture strength of separation membrane (Gf) | Ionic conductivity of separation membrane (ms/cm) | Ion migration number of separation membrane | 5C discharge capacity retention rate (%) | capacity loss for 7 days (%) |
| Example 1 | G1 | 71 | 65 | 1.9 | 0.46 | 96.9 | 0.29 |
| Example 1a | G1 | 46 | 41 | 1.4 | 0.41 | 93.7 | 0.47 |
| Example 1b | G1 | 73 | 68 | 2.0 | 0.47 | 97.2 | 0.28 |
| Example 1c | G1 | 72 | 67 | 2.0 | 0.48 | 97.0 | 0.28 |
| Example 2 | G2 | 50 | 53 | 1.8 | 0.51 | 97.2 | 0.36 |
| Example 3 | G3 | 64 | 78 | 2.0 | 0.48 | 96.5 | 0.31 |
| Example 4 | G4 | 58 | 85 | 1.3 | 0.47 | 96.7 | 0.32 |
| Comparative Example 1 | / | 18 | 13 | 1.1 | 0.34 | 91.8 | 0.84 |

Examples 5-8

According to the mass calculation, 0.1 part of water and 99.8 parts of toluene were mixed evenly, and then 0.1 part of a modifier (the selection of the modifier is shown in Table 3) was added into a mixed solvent, stirred and dissolved to obtain a mixed solution. The mass fraction of water in the mixed solution is 0.1%, and the mass fraction of the modifier in the mixed solution is 0.1%. A cellulose non-woven fabric with a thickness of 1 μm was wetted with the resulting mixed solution at 90° C. for 0.1 h, the separation membrane was took out, washed with toluene, dried at 60° C. and irradiated with ultraviolet light for 60 min to obtain a required non-woven fabric separation membrane. The tensile strength and puncture strength of the separation membrane, ionic conductivity and ion migration number of the separation membrane after being wetted in an electrolyte solution were tested.

The obtained non-woven separation membrane, a lithium cobalt oxide positive electrode, a graphite negative electrode, and a conventional commercial lithium-ion battery electrolyte solution were assembled into a lithium-ion battery, and the rate performance of the lithium-ion battery (test method: testing a discharge capacity retention rate at 5C rate) and the self-discharge rate of the lithium-ion battery (test method: capacity loss of the battery for 7 days) were tested.

Examples 5-8 are obtained by using the experimental schemes of different modifiers G5-G8 respectively, the performance test results are shown in Table 3.

Comparative Example 2

The modifiers in Examples 5-8 were replaced with a silane coupling agent γ-(methacryloxy) propyltrimethoxysilane, the tensile strength and puncture strength of a cellulose non-woven fabric with a thickness of 1 μm modified by the silane coupling agent, ionic conductivity and ionic migration number of the cellulose non-woven fabric after being wetted in an electrolyte solution were tested. And the cellulose non-woven fabric with a thickness of 1 μm modified by the silane coupling agent (γ-(methacryloxy) propyltrimethoxysilane), lithium cobalt oxide positive electrode, a graphite negative electrode, and a conventional commercial lithium-ion battery electrolyte solution were assembled into a sodium-ion battery, and the rate performance of the sodium-ion battery (test method: testing a discharge capacity retention rate at 5C rate) and the self-discharge rate of the sodium-ion battery (test method: capacity loss of the battery for 7 days) were tested. The performance test results of the comparative example 2 are shown in Table 3.

number of the separation membrane after being wetted in an electrolyte solution were tested.

The obtained non-woven separation membrane, a sulfur carbon composite positive electrode, a metal lithium negative electrode, and a special electrolyte solution for lithium sulfur battery were assembled into a lithium sulfur battery, and the rate performance of the lithium sulfur battery (test method: testing a discharge capacity retention rate at 5C rate) and the self-discharge rate of the lithium sulfur battery (test method: capacity loss of the battery for 7 days) were tested.

Examples 9-12 are obtained by using the experimental schemes of mixed modifiers respectively, the performance test results are shown in Table 4.

Comparative Example 3

The tensile strength and puncture strength of a glass fiber non-woven fabric with a thickness of 200 without modifier treatment, ionic conductivity and ionic migration number of

TABLE 3 performance test results

| | Modifier | Tensile strength of separation membrane (MPa) | Puncture strength of separation membrane (Gf) | Ionic conductivity of separation membrane (ms/cm) | Ion migration number of separation membrane | 5C discharge capacity retention rate (%) | capacity loss for 7 days (%) |
|---|---|---|---|---|---|---|---|
| Example 5 | G5 | 74 | 47 | 3.6 | 0.49 | 97.3 | 0.25 |
| Example 6 | G6 | 82 | 39 | 3.7 | 0.47 | 97.7 | 0.28 |
| Example 7 | G7 | 69 | 46 | 4.4 | 0.48 | 97.9 | 0.24 |
| Example 8 | G8 | 76 | 44 | 4.3 | 0.48 | 98.1 | 0.24 |
| Comparative Example 2 | silane coupling agent | 25 | 17 | 2.4 | 0.31 | 93.3 | 0.75 |

Examples 9-12

According to the mass calculation, 0.1 parts of water and 0.1 parts of acetone were mixed evenly, and then 99.8 parts of a modifier was added into a mixed solvent, stirred and dissolved to obtain a mixed solution. The mass fraction of water in the mixed solution is 0.1%, and the mass fraction of modifier in the mixed solution is 99.8%. A glass fiber non-woven fabric with a thickness of 200 μm was wetted with the resulting mixed solution at 45° C. for 1 h, the separation membrane was took out, washed with acetone, dried at 200° C. and irradiated with ultraviolet light for 15 min to obtain a required non-woven fabric separation membrane. The tensile strength and puncture strength of the separation membrane, ionic conductivity and ion migration the glass fiber non-woven fabric after being wetted in an electrolyte solution were tested. And the glass fiber non-woven fabric with a thickness of 200 without modifier treatment, a sulfur carbon composite positive electrode, a metal lithium negative electrode, and a special electrolyte for lithium sulfur battery were assembled into a lithium sulfur battery, and the rate performance of the lithium sulfur battery (test method: testing a discharge capacity retention rate at 5C rate) and the self-discharge rate of the lithium sulfur battery (test method: capacity loss of battery for 7 days) were tested. The test results of comparative example 3 are shown in Table 4.

TABLE 4 performance test results

| | Mixed modifier | Tensile strength of separation membrane (MPa) | Puncture strength of separation membrane (Gf) | Ionic conductivity of separation membrane (ms/cm) | Ion migration number of separation membrane | 5C discharge capacity retention rate (%) | capacity loss for 7 days (%) |
|---|---|---|---|---|---|---|---|
| Example 9 | 50% G1 + 50% G2 | 118 | 52 | 11.1 | 0.53 | 98.5 | 0.52 |
| Example 10 | 45% G1 + 55% G3 | 123 | 58 | 11.0 | 0.55 | 98.2 | 0.54 |
| Example 11 | 20% G2 + 80% G4 | 114 | 71 | 10.9 | 0.58 | 98.5 | 0.41 |
| Example 12 | 70% G2 + 30% G3 | 115 | 59 | 11.1 | 0.61 | 99.0 | 0.47 |
| Comparative Example 3 | / | 31 | 20 | 7.8 | 0.35 | 94.3 | 1.59 |

Examples 13-16

According to the mass calculation, 6 parts of water, 42 parts of ethanol and 42 parts of acetone were mixed evenly, and then 10 parts of a modifier was added into a mixed solvent, stirred and dissolved to obtain a mixed solution. The mass fraction of water in the mixed solution is 6%, and the mass fraction of the modifier in the mixed solution is 10%. An mixed non-woven fabric (glass fiber+PE fiber) with a thickness of 30 μm was wetted with the resulting mixed solution at 40° C. for 5 h, the separation membrane was took out, washed with water, dried at 70° C. and irradiated with ultraviolet light for 20 min to obtain a required non-woven fabric separation membrane. The tensile strength and puncture strength of the separation membrane, ionic conductivity and ion migration number of the separation membrane after being wetted in an electrolyte solution were tested.

The obtained non-woven separation membrane, a positive electrode, a negative electrode, and an electrolyte solution were assembled into a lithium metal battery, the rate performance of the lithium metal battery (test method: testing a discharge capacity retention rate at 5C rate) and the self-discharge rate of the lithium metal battery (test method: capacity loss of the battery for 7 days) were tested.

Examples 13-16 were obtained by using the experimental schemes of mixed modifiers respectively, the performance test results are shown in Table 5.

Comparative Example 4

The tensile strength and puncture strength of a mixed non-woven fabric (glass fiber +PE fiber) with a thickness of 30 μm without modifier treatment, ionic conductivity and ionic migration number of the mixed non-woven fabric after being wetted in an electrolyte solution were tested. And the mixed non-woven fabric (glass fiber+PE fiber) with a thickness of 30 μm without modifier treatment, a positive electrode, a negative electrode, and an electrolyte solution were assembled into a lithium metal battery, and the rate performance of the lithium metal battery, (test method: testing a discharge capacity retention rate at 5C rate) and the self-discharge rate of the lithium metal battery (test method: capacity loss of battery for 7 days) were tested. The test results of comparative example 4 are shown in Table 5.

cation, compared with the comparative examples, the battery has a significantly improved rate performance, and a significantly reduced self-discharge speed, which significantly inhibits the internal micro short circuit of the battery.

It can be seen from the test results of Examples 1, 1a, 1b, and 1c in Table 2 that when the non-woven fabric separation membrane is prepared by the method of the present application, the amount of the modifier has an impact on the performances of the separation membrane. Specifically, it shows that the increase of the amount of the modifier within a certain range can improve the performances of the separation membrane, and with the further increase of the amount of the modifier, the performances of the separation membrane tend to be stable. This is mainly because the surface of the separation membrane has been modified by the modifier. In consideration of cost, the amount of the modifier will not be increased indefinitely.

For different battery systems and different modifier structures, the optimal amount of the modifier is not constant, and technicians can easily find the optimal amount through a series of experiments.

Figure 1:
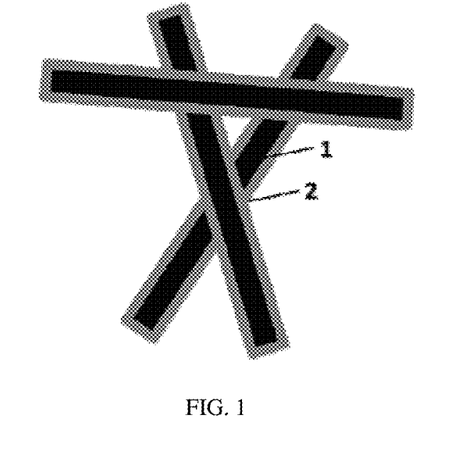
FIG. 1 is a schematic diagram of a fiber structure of a non-woven separation membrane of the present application.
Figure 2:
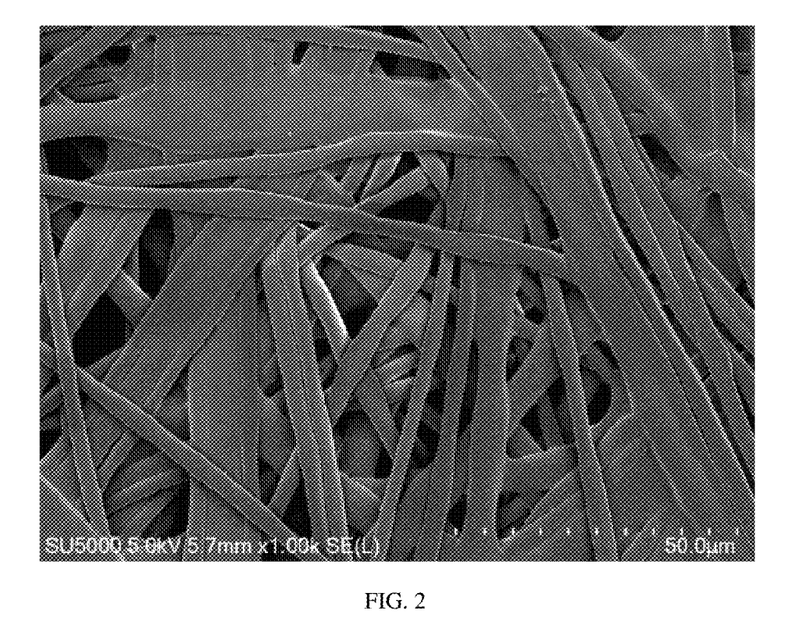
FIG. 2 is a scanning electron microscope photograph of a fiber of a non-woven separation membrane of the present application with an magnification of 1000 times.
Figure 3:
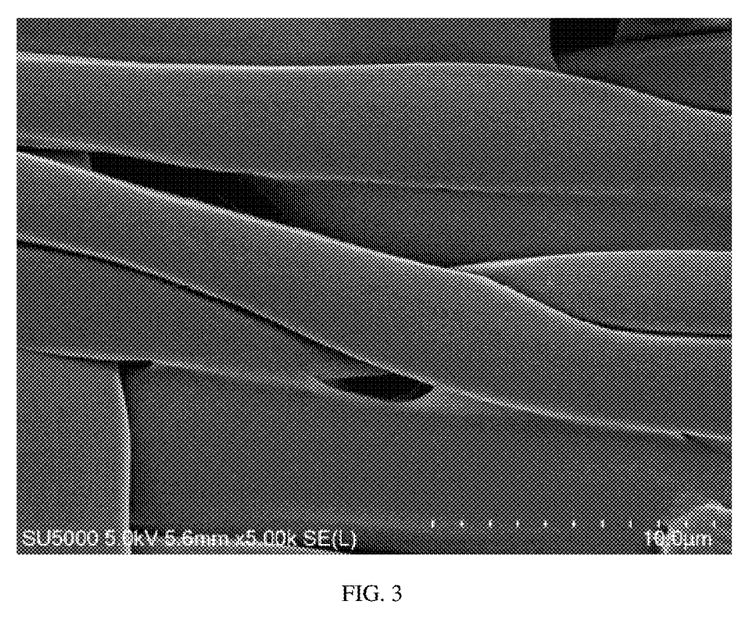
FIG. 3 is a scanning electron microscope photograph of the fiber of the non-woven separation membrane of the present application with an magnification of 5000 times.

FIG. 1 is a schematic diagram of a fiber structure of a non-woven separation membrane of the present application. As shown in FIG. 1, 1 is a fiber constituting the non-woven fabric separation membrane, and 2 is a modifier layer coated on a surface of the fiber, and the modifier layer tightly connects different fibers. The non-woven fabric separation membrane of the present application includes a plurality of fibers, and the fibers are closely connected through a modifier, which significantly improves the tensile strength and puncture strength of the separation membrane. Meanwhile, molecules of the modifier are grafted on surfaces of the fibers, which improves wettability for an electrolyte solution to the separation membrane, thereby improving the ionic conductivity of the separation membrane and the rate performance of a battery. Ti metal or Zr metal in the modifier molecule can effectively attract an electrolyte anion in the electrolyte solution to improve the ion migration number of the electrolyte solution, reduce battery polarization, and improve the rate performance of the battery.

The embodiments of the present application are described above. However, the present application is not limited to the above embodiments. Any modification, equivalent replace-

TABLE 5 performance test results

| | Mixed modifier | Tensile strength of separation membrane (MPa) | Puncture strength of separation membrane (Gf) | Ionic conductivity of separation membrane (ms/cm) | Ion migration number of separation membrane | 5C discharge capacity retention rate (%) | capacity loss for 7 days (%) |
|---|---|---|---|---|---|---|---|
| Example 13 | 40% G5 + 60% G7 | 109 | 54 | 3.7 | 0.49 | 98.4 | 0.36 |
| Example 14 | 25% G2 + 75% G6 | 112 | 45 | 4.0 | 0.51 | 97.8 | 0.42 |
| Example 15 | 90% G3 + 10% G5 | 118 | 48 | 3.5 | 0.52 | 97.5 | 0.44 |
| Example 16 | 30% G1 + 20% G3 + 50% G7 | 105 | 59 | 3.2 | 0.47 | 98.1 | 0.39 |
| Comparative Example 4 | / | 30 | 18 | 2.2 | 0.33 | 93.2 | 1.02 |

It can be seen from the performance test results in Tables 2-5 that the tensile strength, puncture strength, ion conductivity, and ion migration number of the non-woven fabric separation membrane prepared by the method of the present application are significantly improved compared with the comparative examples. For the battery assembled by the non-woven fabric separation membrane of the present appliment, improvement, etc. made within the spirit and principles of the present application should be included in the protection scope of the present application.

What is claimed is:

1. A non-woven fabric separation membrane, wherein the non-woven fabric separation membrane comprises a plurality of polymer fibers and/or glass fibers, the non-woven fabric separation membrane is modified by a modifier, the modifier is bonded with the fibers by a chemical bond, and molecules of the modifier are connected to each other by cross-linking;

wherein the modifier is selected from one or more compounds with a structure shown in the following formula (1):

formula (1)

M=Zr or Ti, n is an integer between 0 and 10000;

$R_1$, $R_2$ and $R_3$ are independently selected from —$NH_2$, —$COCR_0$=$CH_2$, —$(CH_2CH_2O)_{n1}COCR_0$=$CH_2$, —$(CH_2CH_2O)_{n2}R_0$, and the following groups that are unsubstituted or optionally substituted by one, two or more $R_a$: $C_{1-12}$ alkyl, $C_{2-12}$ alkenyl, —$C_{1-12}$ alkylene-O—$C_{1-12}$ alkyl, —$COOC_{1-12}$ alkyl, and $C_{6-20}$ aryl, wherein n1 is an integer greater than or equal to 0, n2 is an integer greater than or equal to 1, n3 is an integer greater than or equal to 0;

$R_a$ is independently selected from halogen, —$NH_2$, —OH, $C_{1-12}$ alkyl, $C_{6-20}$ aryl;

$R_0$ is selected from H, and the following groups that are unsubstituted or optionally substituted by one, two or more $R_b$: $C_{1-12}$ alkyl, $C_{6-20}$ aryl;

$R_b$ is independently selected from $C_{1-12}$ alkyl, $C_{6-20}$ aryl;

wherein n, n1, n2 and n3 respectively represent an average degree of polymerization of corresponding repeating units.

2. The non-woven separation membrane according to claim 1, wherein $R_1$, $R_2$ and $R_3$ are independently selected from —$COCR_0$=$CH_2$, —$(CH_2CH_2O)_{n1}COCR_0$=$CH_2$, —$(CH_2CH_2O)_{n2}R_0$, $C_{1-6}$ alkyl, $C_{2-6}$ alkenyl, —$C_{1-6}$ alkylene-OH, —$C_{1-6}$ alkylene-$NH_2$, —$C_{1-6}$ alkylene-O—$C_{1-6}$ alkyl, —$COOC_{1-6}$ alkyl, —$C_6H_5$, —$(CH_2)_{n4}C_6H_5$, —$C_6H_4C_{n'}H_{2n'+1}$, and —$C_6H_{5-m}F_m$; wherein n1 is an integer greater than or equal to 0, n2 is an integer greater than or equal to 1, n3 is an integer greater than or equal to 0, n4 is an integer greater than or equal to 1, n' is an integer greater than or equal to 1, and m is an integer between 1 and 5.

3. The non-woven separation membrane according to claim 1, wherein $R_0$ is selected from H, $C_{1-6}$ alkyl, —$C_6H_5$, —$(CH_2)_{n5}C_6H_5$, and —$C_6H_4C_{n''}H_{2n''+1}$, wherein n5 is an integer between 1 and 6, and n'' is an integer between 1 and 6.

4. The non-woven separation membrane according to claim 1, wherein $R_1$, $R_2$, and $R_3$ are independently selected from —$CH_3$, —$C_2H_5$, n-propyl, isopropyl, —$C_{12}H_{25}$, —CH=$CH_2$, —$C_2H_4OH$, —$C_6H_5$, —$CH_2OCH_3$, —CO—O—$CH_3$, —$CH_2NH_2$, —$C_6F_5$, —$COCR_0$=$CH_2$, —$(CH_2CH_2O)_{n1}COCR_0$=$CH_2$, —$C_6H_4F$, —$C_{12}H_{24}OH$, and —$(CH_2CH_2O)_{n2}R_0$, wherein $R_0$ is selected from H, $C_{1-6}$ alkyl, —$C_6H_5$, —$(CH_2)_{n5}C_6H_5$, and —$C_6H_4C_{n''}H_{2n''+1}$, wherein n1 is an integer greater than or equal to 0, n2 is an integer greater than or equal to 1, n3 is an integer greater than or equal to 0, n5 is an integer between 1 and 6, and n'' is an integer between 1 and 6.

5. The non-woven fabric separation membrane according to claim 1, wherein the non-woven fabric separation membrane has a tensile strength of 20-200 MPa, and a puncture strength of 20-200 Gf.

6. The non-woven fabric separation membrane according to claim 1, wherein the non-woven fabric separation membrane, after being wetted by an electrolyte solution, has an ionic conductivity of 1-20 ms/cm, and an ion migration number of 0.3-0.9.

7. The non-woven fabric separation membrane according to claim 1, wherein the non-woven fabric separation membrane has a porosity of 10-90%, and a pore diameter of 0.1-3 μm.

8. A process comprising performing a membrane separation in a lithium-ion battery, a sodium-ion battery, a potassium-ion battery, a lithium sulfur battery, and a lithium metal battery with the non-woven fabric separation membrane according to claim 1.

\* \* \* \* \*